United States Patent [19]

Janakirama-Rao

[11] Patent Number: 4,913,472
[45] Date of Patent: Apr. 3, 1990

[54] SEALED JOINT FOR A ROCKET EMPLOYING FUSED INORGANIC VITREOUS MATERIAL

[76] Inventor: Bhogaraju V. Janakirama-Rao, 2267 SW. 43rd Pl., Gainesville, Fla. 32608

[21] Appl. No.: 898,917

[22] Filed: Aug. 21, 1986

[51] Int. Cl.$^4$ .................. F16J 15/10; F16J 15/12; F16L 19/02

[52] U.S. Cl. .................. 285/336; 60/253; 277/26; 277/235 R; 277/DIG. 6; 285/187; 285/363; 285/911

[58] Field of Search .......... 277/236.1, DIG. 6, 235 R, 277/227, 26; 60/253, 251, 255; 285/911, 368, 336, 923, 187, 904, 422; 403/28, 404; 29/526 R; 174/50, 63; 220/5 A; 156/304.2, 89, 92, 325

[56] References Cited

U.S. PATENT DOCUMENTS

| | | | |
|---|---|---|---|
| 1,467,064 | 9/1923 | Oleson | 285/368 X |
| 1,592,175 | 7/1926 | Boyd | 285/368 X |
| 2,506,687 | 5/1950 | Scherrer | 285/911 X |
| 2,829,793 | 4/1958 | Baumann | 285/368 X |
| 2,911,239 | 11/1959 | Marzolf, Sr. | 285/368 X |
| 2,919,936 | 1/1960 | Hurley | 285/368 X |
| 3,088,273 | 5/1963 | Adelman et al. | 60/253 |
| 3,151,869 | 10/1964 | Butcher | 285/368 X |
| 3,213,184 | 10/1965 | Bondley | 174/50.63 X |
| 3,322,444 | 5/1967 | Sewell et al. | 285/363 X |
| 3,370,874 | 2/1968 | Scherer et al. | 403/28 |
| 3,481,638 | 12/1969 | Dryden | 277/235 R X |
| 3,498,649 | 3/1970 | Pfeuffer | 285/336 X |
| 3,507,506 | 4/1970 | Tillman, III | 277/235 R X |
| 3,563,573 | 2/1971 | Crompton et al. | 285/368 X |
| 3,618,989 | 11/1971 | Ito | 285/336 |
| 3,783,173 | 1/1974 | Twomey | 277/235 R X |
| 3,948,533 | 4/1976 | Novosad | 277/235 R X |
| 4,171,832 | 10/1979 | Metcalfe | 285/911 X |
| 4,340,233 | 7/1982 | Yamamura et al. | 277/1 |
| 4,411,436 | 10/1983 | Durenec | 277/53 |
| 4,445,696 | 5/1984 | Raj et al. | 277/1 X |
| 4,445,715 | 5/1984 | Inoue et al. | 285/911 X |
| 4,667,988 | 5/1987 | Maier et al. | 285/368 X |

FOREIGN PATENT DOCUMENTS

| | | | |
|---|---|---|---|
| 3206570 | 9/1983 | Fed. Rep. of Germany | 285/368 |
| 460821 | 12/1913 | France | 285/368 |
| 1302830 | 7/1962 | France | |
| 173664 | 10/1982 | Japan | 277/235 R |
| 781144 | 8/1957 | United Kingdom | 285/368 |
| 995763 | 6/1965 | United Kingdom | |

OTHER PUBLICATIONS

Report of the Presidential Commission on the Space Shuttle Challenger Accident, pp. 77, 20, 121; 6/86.
"Neo-Ceramic Glasses and Their Structure" by Janakirama-Rao, reprinted from Glass Technology, vol. 5, No. 2, 4/64.
"Unusual Properties and Structure of Glasses . . . " by Janakirama-Rao, International Glass Congress.

*Primary Examiner*—Allan N. Shoap

[57] ABSTRACT

A design for sealing metal-to-metal, of sections of rocket shell with fusible vitreous inorganic "glass-ceramic" compositions, which will not burn-out from high temperatures of rocket-exhaust, is disclosed. The design is intended to set up a thermal-gradient across the cross section of the sealed metal flanges. The thermal-gradient utilizes the useful property of the vitreous state of the seal, viz., the continuous viscosity change from the relatively low viscosity of molten glass at high temperature, to a very high viscosity of almost solid state at lower temperatures. This mechanism achieves a leak-proof "glass-ceramic" or glass seal between the metal flange joints of sections of rocket-shell. The vitreous seal is capable of withstanding a wide range of temperature inside the rocket, of −50° C., to over 1000° C., without failure when the rocket is fired. A metal-to-metal joint provided with leak-proof fused inorganic vitreous seal material capable of withstanding high and low temperatures, and the method of making the same are disclosed.

10 Claims, 1 Drawing Sheet

SEALED JOINT FOR A ROCKET EMPLOYING FUSED INORGANIC VITREOUS MATERIAL

BRIEF SUMMARY OF THE INVENTION

This invention relates to a device for the accomplishment of a leak-proof metal-to-metal vitreous seal between matching metal flanges of large sections of rocket shell assembly. More particularly, it relates to improved seal design which utilises the favourable properties of inorganic glass-ceramic fusion sealing materials. This invention seeks to eliminate the organic elastomer seal burn-out problem of the currently practiced solid fuel booster rocket sealing technology, by providing an alternate sealing mechanism, which uses inorganic vitreous materials. The inorganic vitreous seal, between flanges of adjacent rocket sections stacked up along their common axis, will not burn out or deteriorate over a temperature range of $-50°$ C. to $+1,000°$ C. in the interior of the rocket. Glass-ceramic sealing compositions come under this category.

In accordance with this invention, the object of the seal-design is achieved by setting up an enhanced thermal-gradient, by means of a heat-sink mechanism across the cross section of the sealed metal flanges as shown in FIGS. 2, and 3, in the accompanying drawings. The thermal-gradient utilises the nature of the vitreous state, of continuous change of viscosity from that of molten liquid at higher temperature, to a very high viscosity of almost solid state at lower temperature. When the rocket is fired, the heat of combustion of fuel inside the rocket radiated to the rocket wall is progressively attenuated by the heat-sink mechanism across the cross-section of the sealed metal flanges. When over-heating occurs inside the rocket, the vitreous part of the seal retains its high viscosity at the cooler end of the heat-sink flange, and remains in a nearly solid state. This is made possible by the thermal gradient. The solid seal prevents leakage of high temperature gases of the rocket-exhaust which exert high pressure at the joints of sections of the rocket shell.

The combination of the thermal-gradient heat-sink flange mechanism and strong adherence to metal by the glass-ceramic seal, which utilizes the thermal-gradient to remain solid and retain the efficiency of its sealing function, is a device of this invention which seeks to enhance the reliability of solid fuel rocket performance by eliminating the O-ring rubber seal burn-out problem of current practice and prevent disasters of the type of space shuttle Challenger in January, 1986.

BRIEF DESCRIPTION OF THE DRAWINGS

FIG. 2. shows a tube-ring seal between forged flanges, with heat-sink back-up metal rings bolted together.

FIG. 3. shows a tube-ring seal between machined flanges which are welded to the rocket section and which serve as heat-sink, with a thermal-gradient across its cross-section.

DETAILED DESCRIPTION OF THE INVENTION

Figure 1:
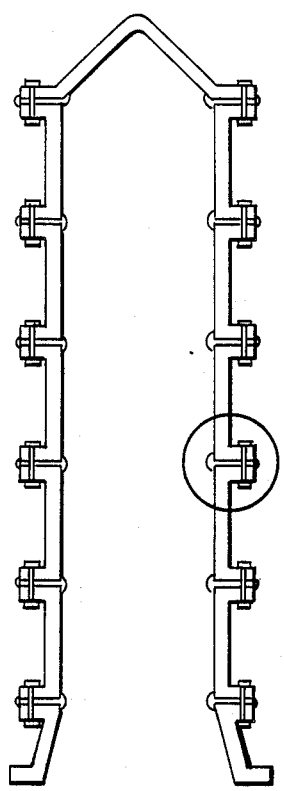

This invention particularly deals with;
(a). Design aspect of the sealing mechanism, as shown in cross-section in FIGS. 2 and 3, and
(b). the methods of forming the metal flanges to set up a thermal gradient, and of applying and fusing the glass-ceramic sealing composition to make a leak-proof high temperature resistant vitreous seal with high adhesion to the metal flanges of sections of the rocket assembly.

The term, seal, in this disclosure refers to partially or completely fusible inorganic vitreous or conglomerate material, the thermal expansion and contraction coefficients of which, adequately match those of the metal used in the flanges of the sections of rocket shell. In addition, the glass-ceramic sealing composition when fused, should adequately wet the metal and form a strongly adherent seal between the metal flanges, and should not fail when the rocket is hot or cold in the combustion area.

The term glass-ceramic refers to a wide variety of fusable vitreous and semivitreous inorganic compositions.

Material compositions known as "glass"; "ceramic"; and "glass-ceramic", can be distinguished from their structural characteristics as follows:

| Material | Distinguishing characteristics |
| --- | --- |
| Glass | Three dimensional random-network structure, concoidal fracture; vitreous; transparent; Newtonian viscosity; absense of sharp melting point. |
| Ceramic | Crystal lattice structure; repeating unit cell in three dimensions; sharp melting point. |
| Glass-ceramic | Coexistance of vitreous phase (glass) as the dominent fraction and crystalline phase as the minor fraction precipitated from the melt. |

The formulation of glass-ceramic compositions to suit the properties of specific metals or alloys is a specialised field involving phase relationships. The compositions of glass-ceramics can be chosen which wet the metal surface well and form a strong adherent and leak-proof seal and match the properties of specific metals or alloys used in making the rocket shell.

BACKGROUND OF THE INVENTION

The need for this invention became apparent to this inventor when the space-shuttle disaster of January, 1986, was reported on national T.V., to have been caused by the burn-out of O-ring seals made of organic elastomer. Since the temperature of burning gases of solid-fuel booster rocket is known to exceed 1000° C., it is reasonable to expect that sooner or later in the event of a mishap, any organic material in the vicinity of the hot flames of burning gases exerting enormous pressure, is likely to burn-out, because all organic materials containing carbon molecules do the same, well below 400° C. In order to avoid the possibility of hot gas leakage through the seal, which caused the disaster, the search for an alternate sealing technique, as well as a refractory sealing material which will not burn out or decompose at 1000° C. and will not deteriorate at 0° to 5° C., is a logical step forward. Research experience with inorganic glass and glass-ceramic materials indicates that such possibility exists. Fused inorganic vitreous compositions do not burn out or deteriorate in the temperature range of 0° C., to well over 1500° C. Glass-ceramic compositions have poor elasticity relative to organic elastomers or rubbers; but glass-ceramics have the advantage that their compositions can be adjusted to match their properties such as thermal expansion and contraction coefficients very closely to those of the metals which they seal. A fused inorganic glass-ceramic seal between matching flanges of metal sections of a rocket shell, circumvents the need for elasticity of the seal because it expands or contracts at the same rate as the metal does when the rocket is hot or cold.

PRIOR ART

According to current practice of the art, organic elastomers in the form of O-rings are used as the sealing material between assembled sections of the booster rocket shell. The reasons for using organic elastomer O-rings are apparently:
 (a). the property of elasticity which accommodates the thermal expansion and contraction of the metal sections of the rocket, when it gets hot or cold;
 (b). earlier rocket launchings using O-ring seals have been successful;
 (c) ready availability and simplicity in assembly of the rocket; and
 (d). relatively low cost.

In its physical properties, the O-ring seal somewhat resembles the familiar neoprene rubber ring seal used in the domestic pressure cooker, which can withstand moderate temperature and pressure exerted by steam. It was a convenient technique developed for the space-shuttle program, and it worked successfully for several space-shuttle launchings. The technique had the advantage of recovery, reassembly and reuse of the same aero-shell structure for repeated launchings, thereby effecting economic savings.

Ever increasing demands for heavier pay-loads however, tested the limits of the seal mechanism of the above technique of prior art. According to the report of the presidential commission on the space-shuttle Challenger accident, the death of 7 astronauts aboard the Challenger in January, 1986 was caused by the failure of O-ring seals made of organic elastomer used in the solid fuel booster rocket of the shuttle. The low ambient temperature of 5° C., at the time of launching and the very high temperature accompanied by enormous pressure suddenly generated by the combustion of solid fuel inside the powerful rocket, proved to be beyond the capacity of the organic elastomer to withstand. The O-ring seal consequently burned out, and the leaking hot gas and flame-jet caused the explosion of the liquid hydrogen and liquid oxygen fuel system of the external tank.

OBJECTIVE OF THIS INVENTION

This invention seeks to eliminate the organic-seal burn-out problem, by providing an alternate sealing mechanism which uses inorganic vitreous materials which will not burn out even at high temperatures over 1000° C., generated by the heat of combustion inside the rocket. Glass-ceramic materials come under this category. Glass-ceramics have their own special properties, and their compositions can be custom-tailored to adjust their properties to be compatible with the properties of the metal or alloy used in the rocket shell. Such knowledge and experience exists, in the field of glass-ceramic science and technology.

NOVEL FEATURES OF THIS INVENTION

The most important novel feature of this invention, consists of a contoured flange and rod design, to provide an efficient thermal gradient heat-sink mechanism, and the nature of the vitreous seal which takes advantage of the temperature gradient. The vitreous seal offers a continuous change of viscosity in a wide range of temperature, from the low viscosity of molten glass at high temperature to the very high viscosity of almost solid state at low temperature, along the temperature gradient set up across the metal flanges, when the rocket is fired.

Figure 2:
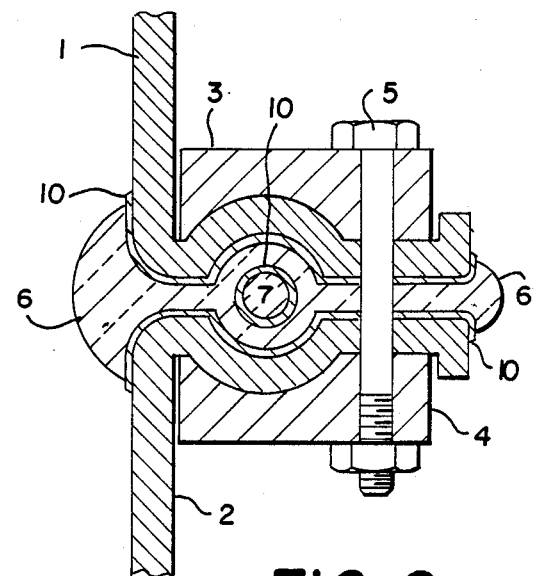
FIGS. 2 and 3, of the accompanying drawings present the essential design features of this invention. The figures show the expanded cross-sectional view of the heat-sink mechanism and the glass-ceramic seal between the matching flanges of upper and lower sections of a rocket shell. None of the Figs. are drawn to scale. Relative dimensions of parts are exaggerated for the sake of clarity. Each part is identified by numerals andis described in detail later in the disclosure. Each Fig. is a distinct embodiment of this invention, with distinct features intended to exploit the possibilities offered by the heat-sink mechanism. The location of the seals of FIGS. 2 and 3, with respect to the rocket shell, is shown in FIG. 1.
Figure 3:
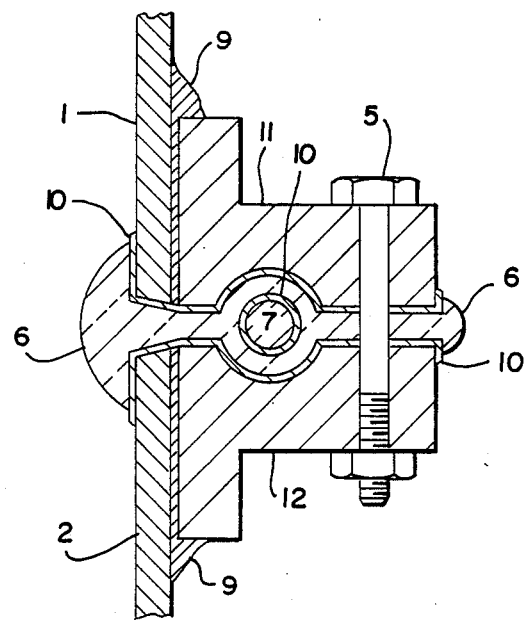

Another important novel feature of this invention is the maximisation of heat absorbtion by the use of (a) solid metal rod 7 embedded in the fused vitreous seal 6 between the forged flanges 1 and 2 of FIG. 2, and welded flanges 11 and 12 of FIG. 3, and (b) back up metal rings or strips 3 and 4 of FIG. 2. Efficient heat absorbtion contributes to the reliability of the vitreous seal over a wide range of temperature.

Another important novel feature of this invention is the choice of materials used to make a leak-proof seal which is compatible with the metal in its physical and chemical properties and which is capable of functioning without failure, in the temperature range of −50° C. to over 1000° C., in the interior of the rocket shell.

A yet another important novel feature of this invention is the retention of the reusable character of the rocket shell.

HEAT-SINK AND ITS INFLUENCE ON GLASS-CERAMIC SEAL (a). When the rocket is fired, a temperature-gradient is set up across the cross-section of the flange joint shown in FIG. 2 hotter at the inner end facing the interior of the rocket, and relatively cooler at the outer end.
 (b). The back-up metal rings or strips 3 and 4 of FIG. 2 which are in contact with the entire area of the forged flanges 1, and 2, serve to enhance heat absorbtion by providing more metal per unit weight. The back-up metal offers a choice of lower density and higher thermal conductivity relative to that of the flange metal. The result is an improved temperature gradient with a much lower temperature at the outer end of cross-section of the flange joint shown in FIG. 2.
 (c). The precision machined monolythic flanges, 11, and 12, which are welded to the respective sections of the rocket shown in FIG. 3, function in a similar way as the back-up metal and forged flange combination shown in FIG. 2. to serve as a heat-sink and temperature-gradient mechanism.
 (d). The solid metal rod ring, 7, embedded in fused vitreous seal between the contoured flanges, serves to absorb more heat. It also offers more surface to the vitreous seal. The result is enhanced efficiency of the thermal-gradient heat-sink mechanism.
 (e). The glass-ceramic seal fused between the metal flanges, takes full advantage of the temperature-gradient set up by the firing of the rocket. When over-heating occurs, the vitreous part of the glass-ceramic seal resoftens progressively from the start to the outer end of the flange joint. The pressure of the combustion gases from the interior of the rocket, tends to push the softened part of the heated seal against the relatively cooler area of the flange joint where it solidifies.

(f). The lower temperature at the outer end of the flange joint keeps the vitreous part of the glass-ceramic seal, in a state of viscosity high enough to act as a solid leak-proof seal resisting the heat and pressure of the burning gases from starting a leak. The crystalline phase within the glass-ceramic is more refractory than its glassy phase and provides structural support when overheating occurs. The result is an automatic self repairing sealing mechanism of this invention.

(g). Higher altitudes and acceleration of the rocket in flight, cause cooler air-flow around the rocket shell and increase the cooling effect on the outer surface of the metal flanges, which in turn cool the vitreous seal, thereby contributing to its efficiency.

Metal-to-glass, or metal-to-glass-to-metal sealing is a well-known prior art, and is used in commercial manufacture of vaccume tubes etc, the diameter of which is in the order of a few centimeters. But this technique is not adequate for use in making massive metal-to-metal leak-proof vitreous seals for rocket sections which are several feet in diameter and which have to withstand high temperatures and pressures generated by powerful heat of combustion of solid fuels.

Metal-to-metal seal with glass-ceramic vitreous materials according to the designs of this invention, is efficient at sub-zero temperatures as well as at high temperatures. The addition of refractory microcrystalline fillers to glass-ceramic sealing compositions further enhances the high temperature resistance of the seal. With the use of the design features of FIGS. 2, and 3, in association with glass-ceramic sealing materials, it is possible to achieve leak-proof seals capable of functioning efficiently in the high and low temperatures confronted by the rocket.

MAKING HEAT-SINK FLANGES (i). The contours of metal flanges, 1, and 2, of FIG. 2 and back-up metal rings 3 and 4, can be made as follows:

Each section of the rocket shell is mounted on a rotory platform. The desired width of the edge of the section is heated to the softening temperature of the metal by suitable means, such as induction-heating, or electrical or gas flame heating. The red hot portion of the rocket section is roller-forged to form a flange extending radially outward, perpendicular to the axis of the rocket-section and conforming to the desired contour. The hot formed flange is then coated with glass-ceramic seal by suitable a technique described later in this disclosure, and fused to form an enamel of desired thickness. The coated hot flange is then annealed and cooled. The contour of the flange is designed to accommodate the solid metal rod, 7, between the flanges to enhance heat absorbtion by the sealed flange joint. Provision is made in the contour for uniform space between the flanges and around the rod 7, to be filled with vitreous glass-ceramic seal 6.

(ii). The back-up metal rings 3 and 4 of FIG. 2. can be roller-forged at softening temperature to conform to contours of the respective flange. The back-up metal rings provide choice for the use of lighter metals with higher thermal conductivity, relative to that of the flange metal. The result is a more efficient thermal-gradient heat-sink mechanism of the sealed flange-joint.

(iii). The flanges 11 and 12 of FIG. 3 are precision machined, in contrast to the roller forged flanges of FIG. 2. The machined flanges 11 and 12 are welded at 9 to the rocket sections and do not use back-up metal. This embodiment of the invention has the advantage that flanges can be mass produced separately and then welded to the rocket section.

All embodiments of this invention shown in FIGS. 2, and 3, use the solid metal rod 7, embedded in fused glass-ceramic seal material between the flanges to maximise the efficiency of the thermal gradient heat-sink mechanism of the sealed flange joint. The sealed flanges and back-up metal rings are secured by bolts and nuts, 5.

SPECIAL FEATURES OF THE DRAWINGS

FIG. 2. shows a tube-ring seal between contoured flanges forged from the respective end of each rocket section.

This embodiment minimises the weight of the flange-seal mechanism, by the use of back-up metal rings or strips made of lighter metal such as aluminum, titanium or the like, secured by bolts and nuts to the forged flanges. The lighter back-up metal rings provide more metal per unit weight, to remove heat from the flange and enhance the efficiency of the thermal-gradient heat-sink mechanism.

FIG. 3. shows a tube-ring seal between machined flanges welded (9) to the respective end of each section of the rocket.

This modification or embodiment has the advantage that precision machined flanges can be made independently of the rocket section, and then welded to it. It also has the limitation of weight versus thrust ratio.

Both embodiments of this invention represented by FIGS. 2 and 3, function by the same mechanism which consists of:

(a). Heat-sink metal flanges extending outwardly from the common axis of the heat-generating stacked rocket sections, to develop a thermal-gradient across the flange joint when the rocket is fired;

(b). Solid metal rod fitting into the contoures between the flanges and serving to maximise the efficiency of thermal-gradient heat-sink mechanism;

(c) Oxide layer 10, on metal surfaces of 1,2 and 7 of FIG. 2 and 1,2,7,11,12, of FIG. 3, at the metal to seal interface, to enhance adhesion;

(d). Fused inorganic vitreous glass-ceramic seal between the flanges, which utilises the thermal-gradient to develop a built-in automatic self-sealing mechanism that prevents seal failure in the event of over heating and consequent high pressure generated by combustion of fuel inside the rocket.

When excessive heat resoftens the glass-ceramic seal at the seam of flange joint facing the heat of combustion, the accompanying high pressure pushes the softened seal against the relatively cooler outer area of the joint. The cooled vitreous seal stiffens to a solid state, thus forming an automatic self-healing leak-proof sealing mechanism.

PREFERRED EMBODIMENTS

The preferred embodiments of this invention are shown in FIGS. 2 and 3. Each embodiment has its advantages for the intended performance. They are preferred for the following reasons:

FIG. 2.
- (i). forged flanges are relatively simpler to make and are less expensive;
- (ii). back-up metal offers a choice of lighter metals with higher thermal conductivity, to absorb more heat and achieve improved efficiency of the thermal-gradient heat-sink mechanism;
- (iii). the oxide layer 10, on metal surfaces 1,2, and 7, in contact with the fused vitreous seal enhances adhesion of vitreous seal to the metal.

FIG. 3.
- (i). precision machined flanges 11 and 12 can be manufactured independently of the rocket sections and welded separately;
- (ii). the technique offers greater reliability at a higher cost;
- (iii). the relatively more massive flanges 11 and 12 provide efficient heat absorbtion and thermal-gradient mechanism, without the use of back-up metal rings 3 and 4 of FIG. 2;
- (iv). the oxide layer 10, on metal surfacesof 1,2,7,11, and 12 enhances the adhesion of vitreous seal to metal.

Both the embodiments shown in FIGS. 2 and 3 use a glass-ceramic seal along the full area of the joint. Both offer the maximum surface area of the seal 6, exposed to oxidised metal at the interface. The fused seal can withstand the extra ordinary pressues generated in high-thrust rockets which are intended to carry extra heavy pay loads into space.

CHOICE OF GLASS CERAMIC SEALING COMPOSITION

It is important to understand the nature of glass and glass-ceramic materials, to understand the function of the vitreous seal in rocket applications. The choice of these materials to form a fused leak-proof seal between the metal flanges, is prompted by their characteristic structure and properties usable in this invention. The constitution of glass-ceramics is such that two phases coexist at a temperature range characteristic of each composition. One phase is vitreous while the other phase is micro-crystalline. The operative temperature range of the vitreous as well as the crystalline phases, depends on the relative concentrations and the number of atomic species which take part in the glass-ceramic composition. This feature makes the glass-ceramic, a very versatile material whose composition can be custom-tailored to suit the properties of the metal or alloy, to which it is fused in order to make a strongly adherent leak-proof seal. The properties of the two phases of the glass-ceramic cooperate to form an efficient seal between the metal flanges. The vitreous phase when fused, wets the metal surfaces and helps to form a leak-proof seal, with high adhesion and matching thermal properties, while the micro-crystalline phase helps to hold the vitreous phase in place when over-heating occurs. It also helps to moderate the thermal expansion and contraction coefficients of the vitreous phase, to stay in line with those of the metal.

METHOD

Preparation of Metal Surface for Sealing

It is important to examine the properties of the metal used in making the rocket shell and flanges. To improve the wetting of molten glass to metal, it is necessary to pretreat the flange surfaces on both sides of the glass-ceramic seal. This pretreatment consists of heating the matching flanges in air or oxygen, so as to develop an oxide layer, a few microns in thickness, adhering to the metal in areas to be covered by the seal as per FIGS. 2 and 3. The oxide layer on the metal surface improves the wetting and adhesion of the vitreous part of the glass-ceramic seal when fused.

A ground-coat of cobalt containing glass frit fused over the metal oxide, further improves adhesion to iron containing alloys. The glass-ceramic seal fused over the ground-coat makes an efficient leak-proof seal. The ground-coat however, is an optional step and is not an essential requirement for this invention, because glass-ceramic compositions exist, which do not need a ground coat to make a compatible seal with iron containing alloys. The glass-ceramic seal material wets and adheres to the oxide coated metal flange with or without the ground-coat.

METHODS OF APPLICATION OF GLASS-CERAMIC SEAL MATERIAL

The fusion of glass-Ceramic sealing composition by itself or in association with a high temperature refractory ceramic additive involves the following choices suitable for this invention:

(i). Dry Powder Method:

This is the preferred method well suited for the design features of this invention. In this method, the glass-ceramic sealing composition, either by itself or mixed with a refractory ceramic material, is delivered in the form of a dry powder consisting of fine particles of $-100$ mesh to $-325$ mesh size. The dry powder is sprinkled or dusted from an over-head reservoir by means of a vibrodispenser, on to the hot flange maintained at the fusion temperature of the seal. The flange of the rocket shell section is kept moving on a rotating platform.

Automatically controlled uniform heating of the flange of rocket section, is achieved by any one of many heating mechanisms available commercially, viz, gas burner units, Electrical resistance heating, induction heating, radiant heat focussing units, etc. Such heating units can all be equipped with automatic controls, to achieve the specified temperature on the work surface. The heating unit is positioned over head or astride the moving flange. The vibro dispensor which feeds the dry powder sealing composition to the flange is stationed next to the heater unit secured to a hanger. As the dry powder seal contacts the hot flange, the vitreous part of it fuses and forms a uniform coating of vitreous seal.

A modification of the dry-powder technique is to adapt the latest commercially available flame-spray technique, to deliver both heat and sealing powder simultaneously to the flange.

(ii). Wet Slurry Method:

In this method, the fine particles of the glass-Ceramic seal are suspended in a liquid medium (vehicle) in the form of a slurry or paste. The vehicle consists of 1 to 5 percent solution of organic compounds such as ethyl cellulose in a solvent such as butyl carbitol acetate, texanol, pine oil or the like. The organics burn away in air at temperatures below 350° C., leaving behind, the inorganics (glass-Ceramic) which will fuse at higher temperatures. The function of the vehicle is only the convenience in the dispensation of the sealing material on to the surface of the metal substrate. The slurry can be brush-coated or spray-painted or dip-coated at room temperature on to the oxidised metal flange. The wet coating on the flange is dried in circulating hot air at 150° C., to drive of the volatile solvents in the slurry. The dry coating is then subjected to heating cycle at the fusion temperature of the sealing composition. This operation achieves a uniform and strongly adherent semivitreous coating on each flange of individual sections of the rocket shell.

TOUCH-UP OPERATION AND ROCKET ASSEMBLY

This operation involves coating the inside of the respective ends of stacked rocket sections with an additional layer of wet slurry or paste of glass-ceramic seal material to cover the seam of adjacent flanges facing the combustion chamber, and drying it by suitable means. This is done prior to the loading of each section of rocket with solid fuel. The fuel loaded rocket sections may then be assembled and secured with bolts and nuts to form the rocket. When the rocket engines fire, the heat of combustion readily melts the touch-up coating which readily merges with the fused enamel of the same composition at the joint. If excessive heating occurs at the seam facing the combustion chamber, the automatic self-sealing mechanism takes over as explained earlier in section 4–7. When the rocket shell is recovered after putting the payload in orbit, the fused glass-ceramic seal at the seam can be removed by sand-blasting. The rocket sections will then be ready for reuse in the next launching.

I claim:

1. A sealed joint comprising at least two substantially identical axially extending tubular metal sections, each section having an end with a flange extending radially outward from and about the entire perimeter of the respective end, the sections being joined end to end with the flanges opposing each other, each flange having a continuous channel opened to and opposed to the channel in the opposing flange, each flange extending radially outwardly from the respective channel to form opposing surfaces and each flange extending radially outwardly from the respective channel in substantially a single plane, said opposing surfaces having thereat fastening means to join and seal the sections together, said flanges having therebetween a ring of solid metal rod embedded in leak-proof fused inorganic vitreous glass-ceramic material capable of withstanding high and low temperature extremes, said rod and the material thereabout located within the opposing channels, said material extending therefrom to seal the space between the ends of the tubular sections from the inner perimeter of the tubular sections and the inner perimeter of the flanges to the outer perimeter of the flanges to define with said flanges and said fastening means said sealed joint, said material with said rod forming an efficient thermal-gradient heat-sink mechanism in said sealed joint.

2. The sealed joint of claim 1, wherein each flange is welded to its respective end.

3. The sealed joint of claim 1, wherein said flanges are forged from said sections.

4. The sealed joint of claim 3, wherein a back-up metal ring is provided over each flange out of contact with said material.

5. The sealed joint of claim 4, wherein said fastening means comprises bolts extending through spaced holes in said flanges and respective back-up rings and through said opposing faces about said entire perimeter.

6. The sealed joint of claim 1, wherein said fastening means comprising bolts extending through spaced holes in said flanges through said opposing surfaces about said entire perimeter.

7. The sealed joint of claim 1, wherein said tubular metal sections are cylindrical.

8. The sealed joint of claim 1, wherein said tubular metal sections are cylindrical and form part of the wall casing of a rocket.

9. The sealed joint to claim 1, wherein said material has coefficients of thermal expansion and contraction that closely match that of the metal of said sections.

10. The sealed joint of claim 1, wherein the surfaces of the flanges in contact with said material are provided with a thin oxidized coating to enhance adhesion between said material and said surfaces.

* * * * *